United States Patent [19]

Gay et al.

[11] Patent Number: 4,789,052
[45] Date of Patent: Dec. 6, 1988

[54] AUTOMATIVE CLUTCH RELEASE BEARING

[75] Inventors: Christian Gay, Paris; Philippe Lassiaz, Boulogne, both of France

[73] Assignee: Valeo, Paris, France

[21] Appl. No.: 63,750

[22] Filed: Jun. 19, 1987

Related U.S. Application Data

[63] Continuation of Ser. No. 824,838, Jan. 23, 1986, abandoned.

[30] Foreign Application Priority Data

Feb. 1, 1985 [FR] France ............................... 85 01423
Mar. 25, 1985 [FR] France ............................... 85 04376

[51] Int. Cl.⁴ .............................................. F16D 23/14
[52] U.S. Cl. .................................... 192/98; 192/99 S; 192/110 B
[58] Field of Search ..................... 192/98, 99 S, 110 B

[56] References Cited

U.S. PATENT DOCUMENTS

| 559,972 | 5/1896 | Freese | 192/98 |
| 2,810,464 | 10/1957 | Geibel | 192/98 |
| 3,963,106 | 6/1976 | Ernst et al. | 192/98 |
| 4,026,399 | 5/1977 | Ladin | 192/98 |
| 4,042,086 | 8/1977 | Ernst et al. | 192/98 |
| 4,046,436 | 9/1977 | Brown | 308/233 |
| 4,099,605 | 7/1978 | Ernst et al. | 192/98 |
| 4,362,229 | 12/1982 | Villata | 192/98 |
| 4,498,566 | 2/1985 | Renaud | 192/98 |
| 4,519,488 | 5/1986 | Renaud | 192/98 |

FOREIGN PATENT DOCUMENTS

| 2255504 | 7/1975 | France . |
| 2339100 | 8/1977 | France . |
| 2073353 | 10/1981 | United Kingdom . |
| 2117476 | 10/1983 | United Kingdom . |

Primary Examiner—Rodney H. Bonck
Assistant Examiner—Richard M. Lorence
Attorney, Agent, or Firm—Charles E. Brown; Charles A. Brown

[57] ABSTRACT

This is a "pull" type clutch release bearing. There are provided, on the one hand, abutment means adapted for circumferential bearing engagement, in a first direction, of the clutch release bearing on a member external thereto, on rotation of the clutch release bearing about its axis, and, on the other hand, a bracing member adapted to oppose any retrograde rotation of the clutch release bearing after such circumferential bearing engagement.

24 Claims, 4 Drawing Sheets

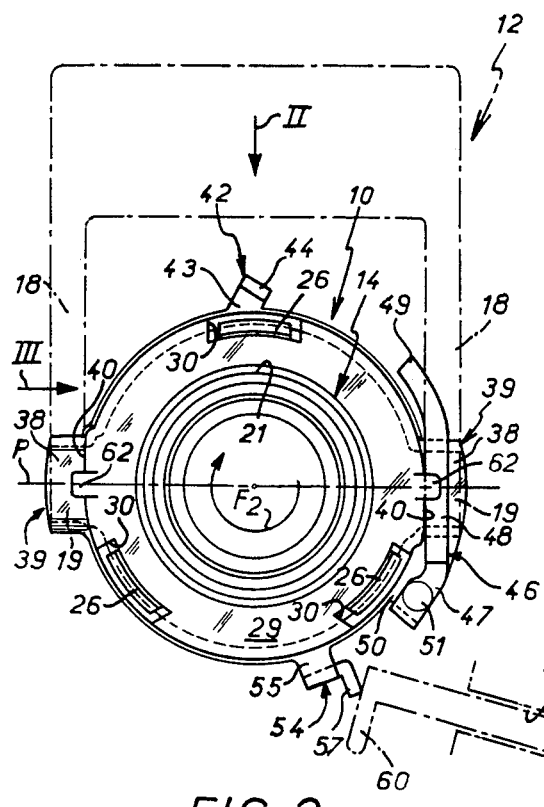
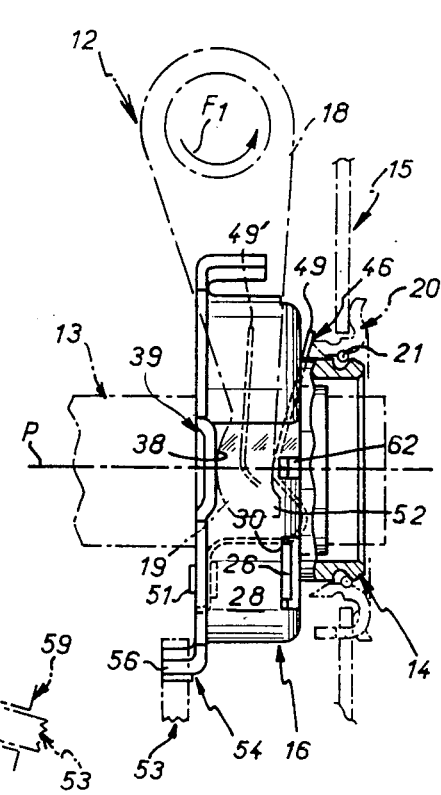
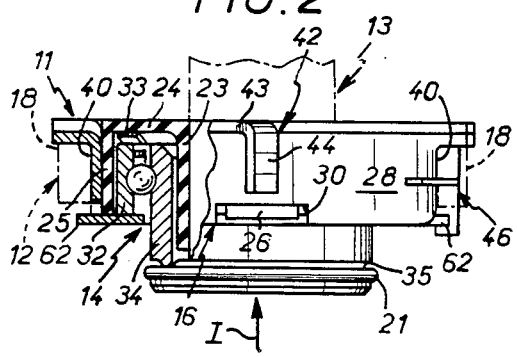
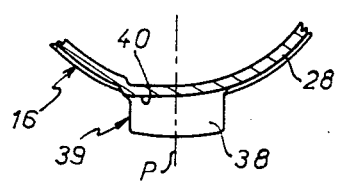
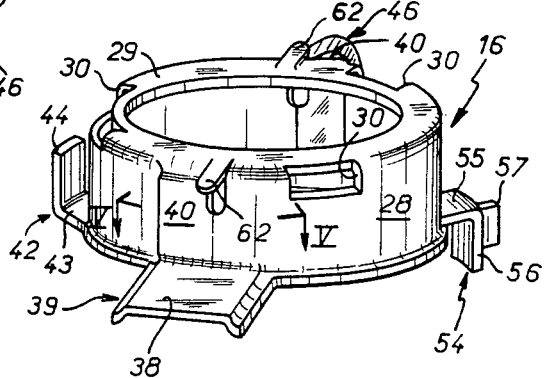

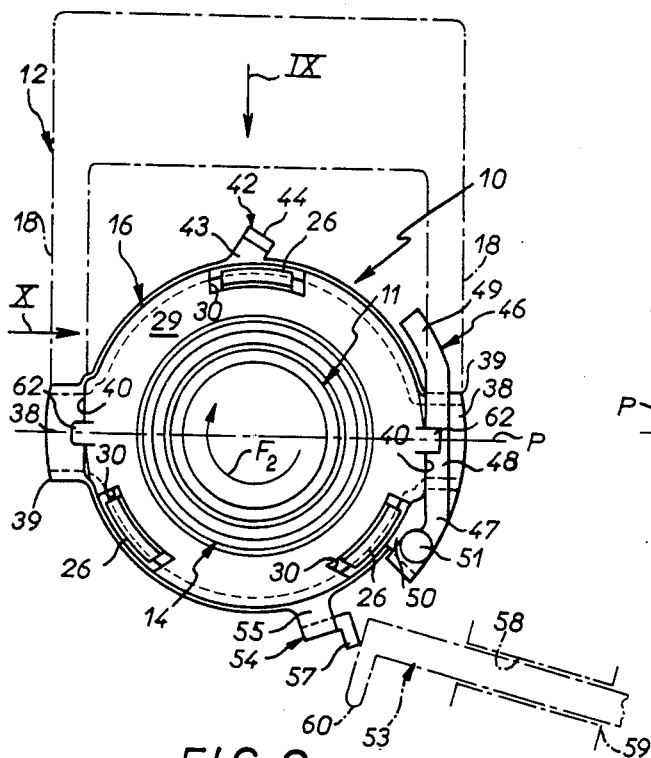
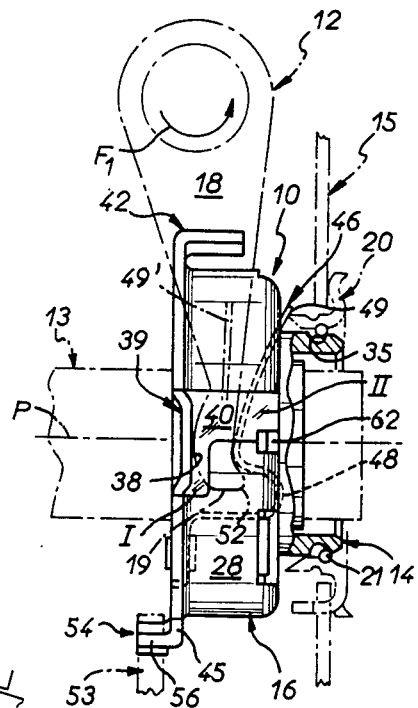
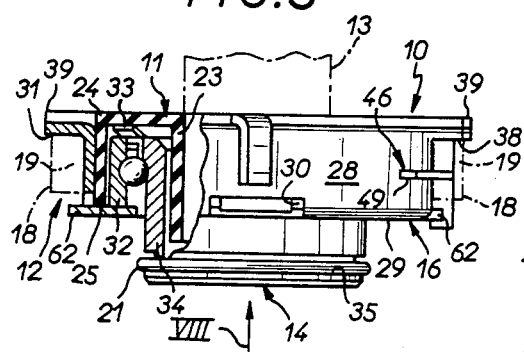
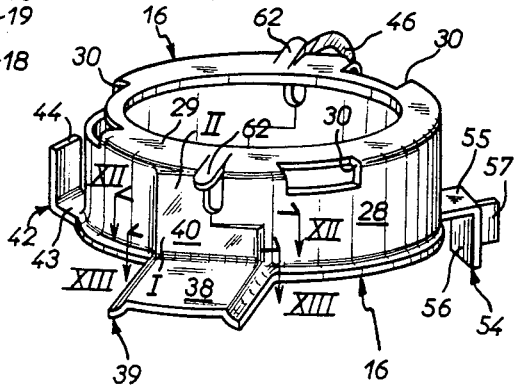
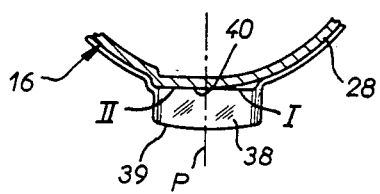

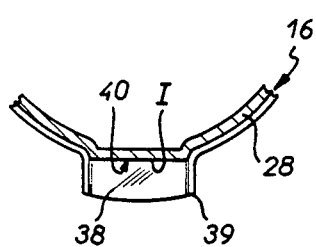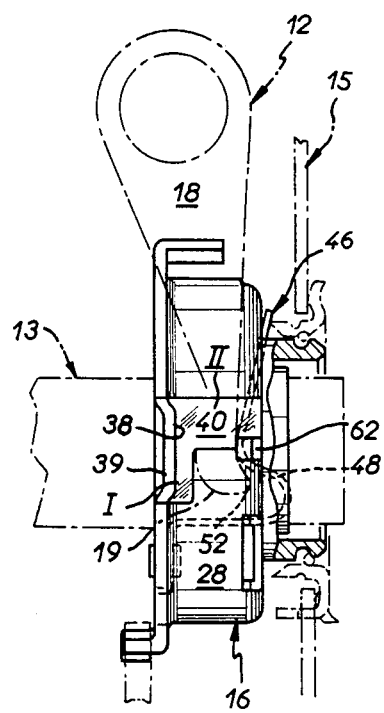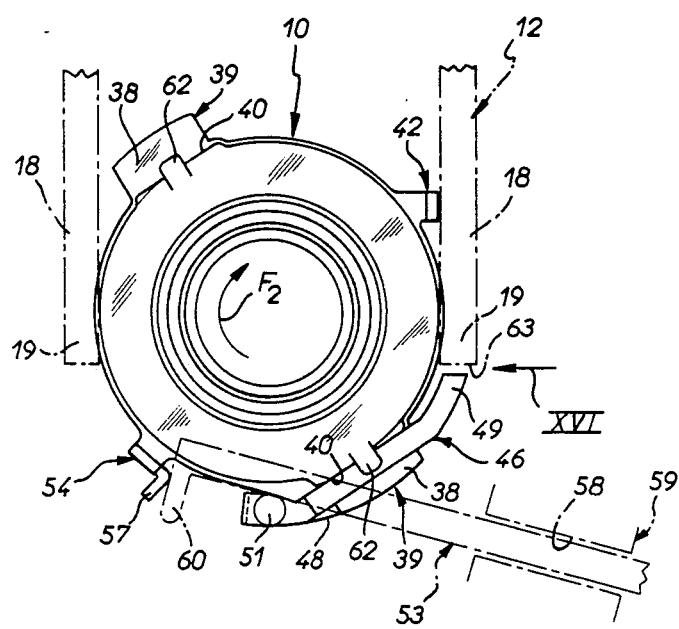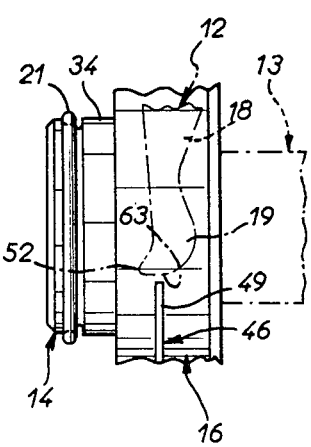

# AUTOMATIVE CLUTCH RELEASE BEARING

This application is a continuation of Ser. No. 824,838, filed Jan. 23, 1986, now abandoned.

The present invention is generally concerned with clutch release bearings, in particular those for automotive vehicles.

As is known, a clutch release bearing generally comprises an operating member through the intermediary of which it is adapted to be operated on by a control member, in practice a clutch release yoke, a drive member through the intermediary of which it is adapted to operate on the clutch release device of a clutch, and a cover through the intermediary of which said drive member is coupled axially to said operating member.

In practice, for the purpose of its operation on a clutch release bearing the clutch release yoke comprises two fingers and for these fingers, or more precisely for the ends or pads thereof, there are provided on the clutch release bearing, for example, in positions diametrally opposed to each other, on the one hand two transverse bearing facets which extend generally radially and, on the other hand, two parallel axial guide facets which extend generally axially.

In practice, each of these axial guide facets is in line with a respective transverse bearing facet. Their specific function is to enable the clutch release yoke, which is fixed in rotation relative to the axis of the clutch release bearing and, through the intermediary of its fingers, in contact with said axial guide facets thereof, to oppose in service any unwanted rotation of the clutch release bearing around its axis as a result of the rotational forces to which it is subjected by virtue of the contact between its drive element and the clutch release device of the clutch concerned.

In the case, for example, of a self-centering clutch release bearing, that is to say a clutch release bearing in which the drive member is able to move in all directions perpendicular to the axis of the assembly relative to the operating member, such rotation of the clutch relese bearing about its axis in service could not fail to disturb the required self-centering action.

The present invention is more particularly directed to clutch release bearings of the "pull" type, that is to say clutch release bearings adapted to act in traction on the clutch release device of the clutch to be controlled.

Such traction operation implies, on the one hand, that the drive member of the clutch release bearing to be employed is engaged behind the clutch release device of the clutch to be controlled, or is engaged with some form of member, a coupling member for example, itself engaged behind this clutch release device, and, on the other hand, that its transverse bearing facets face towards the clutch release device.

As a result of this, in service the fingers of the clutch release yoke are engaged transversely between the transverse bearing facets of the clutch release bearing and the clutch release device of the clutch.

The clutch release yoke is usually pivoted to the casing of the gearbox whereas the clutch release bearing, which is usually slidably mounted on a flared tubular guide also fastened to this casing, is carried by the clutch release device of the clutch since its drive member is engaged behind the latter either directly or indirectly, through the intermediary of a coupling member.

In other words, the clutch release yoke and the clutch release device form parts of two different assemblies, on the one hand that comprising the casing of the gearbox and on the other hand that comprising comprising the engine block, the latter usually carrying the associated clutch.

In this case, one problem to be overcome with "pull" type clutch release bearings of the kind concerned results from the fact that, when the assembly is put together, that is to say when these two assemblies are brought axially towards each other, it is necessary to engage progressively the fingers of the clutch release yoke behind the transverse bearing facets of the clutch release bearing, and from the fact that demounting, that is to say disconnection of these two assemblies from each other, must also be possible for the purpose of subsequent access to the clutch, for example, to change or overhaul it.

The progressive engagement of the fingers of the clutch release yoke behind the transverse bearing facets of the clutch release bearing at assembly time normally entails offering up the clutch release yoke in an initially substantially flat or horizontal position, that is to say parallel to the axis of the assembly, and then pivoting it so that it progressively assumes a vertical position, perpendicular to this axis, as its fingers are engaged behind said transverse bearing facets of the clutch release bearing; a reverse movement of the clutch release yoke is necessary for demounting.

Such pivoting of the clutch release yoke, in one direction or the other, depending on whether it is a question of mounting or demounting, is difficult to carry out, especially when the clutch release yoke is mounted to pivot on a ball-and-socket joint, the additional degree of freedom then making even more complicated the necessary proper control of its movement.

Such pivoting may even prove impossible since it requires a non-negligible dead space for the movement of the clutch release yoke to take place, and this is not always available.

To alleviate these difficulties in part, it has already been proposed to provide a snap-fastener action engagement of the guide member of the clutch release bearing behind the clutch release device of the clutch.

In this case, the clutch release bearing may initially be carried by the assembly of which the gearbox casing forms part, which facilitates the engagement on it of the clutch release yoke also carried by this assembly.

It is then sufficient to provide for axial movement towards each other of the assembly thus equipped and the motor assembly of which the clutch forms part since, at the end of such axial movement towards each other, a simple pivoting movement of limited amplitude of the clutch release yoke implements the snap-fastener fashion engagement of the clutch release bearing on the clutch release device of the clutch.

Although this arrangement is satisfactory at the time of assembly, the same does not apply at the time of demounting unless there is provided, where this is possible, and inevitably at the cost of increased complexity, a facility for decoupling the clutch release bearing from the clutch release device of the clutch.

In the U.S. Pat. No. 4,498,566 issued Feb. 12, 1985 in the name of the assignee of the present application, there is proposed an arrangement whereby relative to the axial plane of the assembly which is substantially perpendicular to them the axial guide facets of the clutch release bearing are truncated, said axial guide facets being totatlly disposed to the side of the plane, one on a first side and the other on the other side.

By virtue of an arrangement such as this it is no longer necessary when assembling or demounting the assembly to impose any pivoting movement of great amplitude on the clutch release yoke.

To the contrary, it is sufficient to pivot the clutch release bearing on itself about its axis through a certain angle, the clutch release bearing and the clutch release yoke being assembled in a manner that in practice resembles a bayonet type coupling or quarterturn coupling.

In service it is of course important to maintain the angular position of the clutch release bearing relative to its axis, to maintain the self-centering action and to provide appropriate means of maintaining the pivoted position of the clutch release bearing at the time of mounting or demounting, also necessary for the security of such mounting or demounting. To achieve this it is necessary to provide specific angular retaining means, the axial guide facets fulfilling a retaining role for one circumferential direction only by virtue of the fact that, as indicated, they are truncated; the aforementioned circumferential direction, hereinafter referred to as the preferred circumferential direction, is in practice chosen to correspond to the rotational forces to which said clutch release bearing is subjected in service.

In the U.S. Pat. No. 4,498,566 mentioned hereinabove, these retaining means consist of a spring which is coupled to the clutch release bearing and which is further coupled to one or the other of two fixed points that are angularly spaced from each other, according to the angular position of the clutch release bearing that is to be retained.

This requires manual intervention on mounting or demounting the assembly and consequently the need to provide a passage or hatch in the clutch casing of sufficient size to enable the hand of the operator to be placed inside this casing.

Although this arrangement has proved and may continue to prove satisfactory, this requirement for a passage or hatch of notable size in the clutch casing necessarilty limits its field of application.

Acceptable in the case of industrial vehicles, for example, it is more often than not unacceptable for touring vehicles, where the space available is limited.

Moreover, because of the retaining spring employed, the axial guide facets of the clutch release bearing are in service constantly urged elastically into contact with the fingers of the clutch release yoke, which may produce some degree of wear.

A general object of the present invention is an arrangement which, while permitting assembly and demounting of a clutch release bearing and a clutch release yoke by simple rotation of the clutch release bearing on itself about its axis, avoids the disadvantages outlined hereinabove.

More precisely, an object of the present invention is a clutch release bearing, in particular for automotive vehicles, of the kind comprising in positions generally diametrally opposed to each other, for a control member, in practice a clutch release yoke, to operate on at least two transverse bearing facets which extend generally radially, this clutch release bearing being generally characterized in that, in combination, it comprises permanent abutment means adapted to procure circumferential bearing engagement in a first direction on another member on rotation about its axis and means, hereinafter referred to for convenience as bracing means, adapted to opposte retrograde rotation of the clutch release bearing in a second direction opposite the aforementioned direction after such circumferential bearing engagement.

The abutment means thus employed may, for example, be formed by a lug provided specifically for this purpose and, to procure the required circumferential bearing engagement, engaging for example with one of the fingers of the clutch release yoke on rotation of the clutch release bearing about its axis; however, they may equally well be formed by any other projection already present on the clutch release bearing and able to engage in this way with one of the fingers of the clutch release yoke or any other member fixed in rotation relative to the axis of said clutch release bearing.

Be this as it may, the bracing means provided in accordance with the invention being permanently coupled to the clutch release bearing, no specific manual action is required to procure, at the time of demounting, immobilization in rotation of this clutch release bearing in its pivoted position specific to such demounting.

The bracing means are themselves operative for this purpose.

In a preferred embodiment the bracing means are elastically deformable and consist in practice of a simple leaf spring so that they may be engaged with the clutch release yoke via a transverse face of the clutch release yoke for the service angular position of the clutch release bearing and through an axial face of the clutch release yoke for the pivoted demounting position of said clutch release bearing.

Initially engaged with the clutch release yoke through a transverse face of the latter, they are automatically retracted elastically relative to the clutch release yoke on rotation of the clutch release bearing about its axis and then come into engagement with the clutch release yoke through an axial face thereof, in practice the edge surface of the end of one of its fingers.

Their bracing effect then opposes, as required, any retrograde rotation of the clutch release bearing.

By virtue of such systematic intervention of the bracing means in accordance with the invention on rotation on itself of the clutch release bearing, it is advantageously possible, for the purposes of the required demounting, to operate blind using, for example, any manipulation member adapted to bring about such rotation on itself of the clutch release bearing.

This manipulation member may simply be a rod which, passed through a small opening in the clutch casing provided for this purpose, extends substantially perpendicularly to the axis of the assembly so as to interfere with the clutch release bearing that has to be made to pivot.

Room for a rod of this kind is easily found, however congested the surroundings may be.

Moreover, as its motion is guided by the small opening by virtue of which is passes through the clutch casing, and its location likewise being estabilished, it is sufficient to actuate it from the outside by simply moving it along its axis to bring about the required pivoting of the clutch release bearing and so to procure, on demounting, systematic operation of the bracing means provided in accordance with the invention on the clutch release bearing.

Also, the axial guide facets of the clutch release bearing are no longer loaded elastically, which advantageously favors minimizing their wear.

Finally, when as described in the U.S. Pat. No. 4,498,566 mentioned hereinabove these axial guide facets are, in service, disposed entirely on a first side of an axial plane of the assembly substantially perpendicular to them, in the case of one of them, and on the other side of this axial plane, in the case of the other of them, in this way preventing any rotation on itself about its axis of said clutch release bearing for a preferred circumferential direction only, when in service, the bracing means in accordance with the invention may advantageously of themselves constitute specific retaining means adapted to oppose any rotation of the clutch release bearing about its axis in service in the circumferential direction opposite the aforementioned preferred circumferential direction.

As mentioned hereinabove, these bracing means are then engaged with the clutch release yoke through a transverse face of the latter.

It is therefore sufficient in this case, for example, to provide in this clutch release yoke any form of projection, such as a heel-piece, for example, adapted to cooperate in circumferential abutting relationship with these bracing means.

By virtue of a further development of this arrangement, the axial guide facets of the clutch release bearing may even be eliminated, the bracing means employed in accordance with the invention being able to constitute of themselves, in cooperation with the clutch release yoke, retaining means adapted to oppose rotation of said clutch release bearing about its axis in service for both circumferential directions.

In another arrangement, the axial guide facets of the clutch release bearing in accordance with the invention are only disposed entirely on a first side of the axial plane of the assembly substantially perpendicular to them, in the case of one of them, and on the other side of this axial plane, in the case of the other of them, over part of their axial length, said axial guide facets each extending to either side of said axial plane in another portion of their axial length, in the vicinity at least of the associated transverse bearing facets.

By virtue of the portion of their axial length over which they thus extend to each side of the axial plane substantially perpendicular to them, the axial guide facets of the clutch release bearing in accordance with the invention may advantageously, and in the manner which is known of itself, of themselves procure rotational immobilization of the clutch release bearing in service about its axis in both circumferential directions whereas, as previously, by virtue of the portion of their axial length where, being truncated, they lie on one side only of this axial plane, they permit the rotation of the clutch relese bearing on itself about its axis necessary for demounting the assembly.

It is sufficient to move the clutch release yoke appropriately so that the ends of its fingers are then in line with the thus truncated portion of these axial guide facets.

Thus as compared with conventional axial guide facets, the useful surface area of these axial guide facets is no longer reduced by half, but only by a lesser fraction, one quarter, for example, which advantageously favors minimizing the wear to which they may be subject; as these axial guide facets are adapted to immobilize the clutch release bearing in rotation in both circumferential directions in service, it is advantageously no longer necessary to provide any specific retaining means, such as any form of spring, for example, for retaining the clutch release bearing in service against rotation in the circumferential direction opposite the preferred circumferential direction.

The characteristics and advantages of the invention will emerge from the following description given by way of example with reference to the accompanying diagrammatic drawings in which:

FIG. 1 is a view in elevation in the direction of the arrow I in FIG. 2 of a clutch release bearing in accordance with the invention, in its in service angular position;

FIG. 2 is a partially cutaway plan view of it in the direction of the arrow II in FIG. 1;

FIG. 3 is a side view of it in the direction of the arrow III in FIG. 1;

FIG. 4 is a perspective view of the cover used in this clutch release bearing, shown in isolation;

FIG. 5 is a partial view of this cover in transverse cross-section on the line V—V in FIG. 4;

FIGS. 8, 9, 10 and 11 are views respectively analogous to those of FIGS. 1 through 4 for an alternative embodiment;

FIGS. 12 and 13 are partial views of the cover of this embodiment in transverse cross-section on the respective lines XII—XII and XIII—XIII in FIG. 11;

FIG. 14 is a side view analogous to that of FIG. 10 for an advanced position of the clutch release yoke with which the clutch release bearing in accordance with the invention cooperates necessary, for this embodiment, for demounting the latter from this clutch release yoke;

FIGS. 15 and 16 are views respecively analogous to those of FIGS. 6 and 7 for this embodiment.

Figure 6:
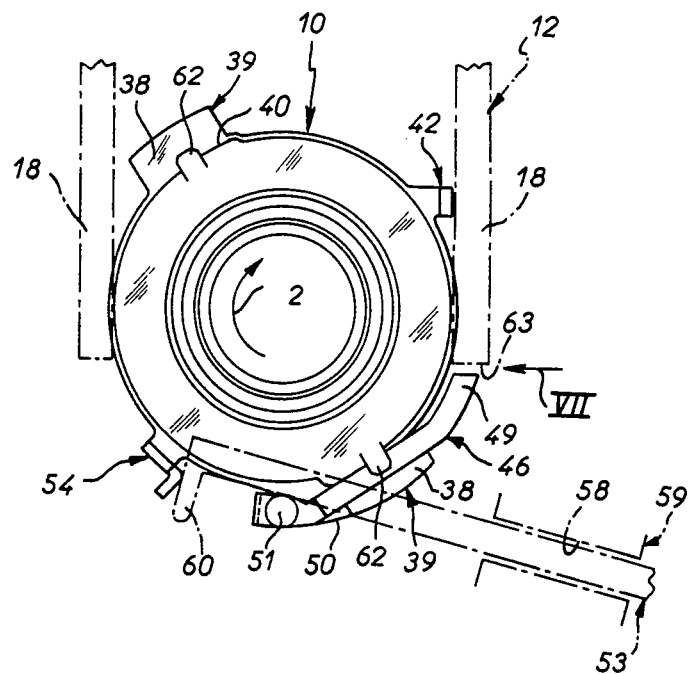
FIG. 6 is a view in elevation analogous to that of FIG. 1 for the pivoted position of the clutch release bearing necessary for demounting it from the clutch release yoke with which it cooperates.
Figure 7:
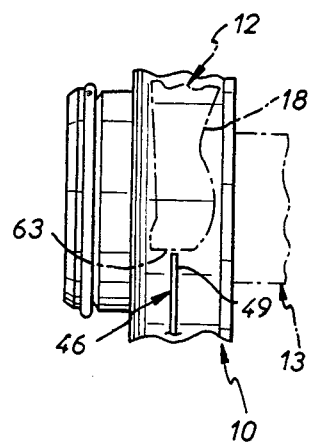
FIG. 7 is a partial side view of this clutch release bearing in its pivoted position seen in the direction of the arrow VII in FIG. 6.

Generally speaking, and as shown in these figures, in which it is shown in full line whereas the members with which it is intended to cooperate are schematically represented in chain-dotted line, a clutch release bearing 10 in accordance with the invention comprises, in the manner known of itself, an operating member 11 through the intermediary of which it is adapted to be operated on by a control member 12, in practice a clutch release yoke, and through the intermediary of which it is further adapted in the embodiment shown to be slidably engaged on a guide member 13, in practice the flared tubular guide usually surrounding the output shaft of a gearbox, a drive member 14 through the intermediary of which it is adapted to operate on the clutch release device 15 of the clutch to be controlled, and a cover 16 through the intermediary of which said drive member 14 is coupled axially to said operating member 11.

In a manner that is known of itself, the clutch release yoke 12 is mounted to pivot on the gearbox casing, not shown in the figures.

For example, and as shown, it is mounted to pivot on this casing about an axis orthogonal to the axis of the guide member 13.

As an alternative, it may be mounted on a ball-and-socket joint.

Be this as it may, for the purpose of its operation on the clutch release bearing 10 the clutch release yoke 12 comprises two fingers 18 by means of which it embraces the clutch release bearing 10 and te ends or pads 19 of which are shaped so as to be able to operate on it.

In the embodiments shown the clutch release device 15 of the clutch to be controlled is a diaphragm.

As the clutch release bearing 10 has to operate in traction on this clutch release device 15, more precisely on the end of fingers that the latter comprises, its drive member 14 must be engaged behind this clutch release device 15, so as to act on that of sides of the latter which faces away from it.

In the embodiments shown this engagement of the clutch release bearing 10 behind the clutch release device 15 is achieved through the intermediary of a coupling member 20 which is permanently carried by the clutch release device 15 and on which, through its drive member 14, the clutch release bearing 10 is engaged elastically, snap-fastener fashion, when the assembly is put together, an elastically deformable ring 21 being provided for this purpose between this coupling member 20 and the drive member 11, said ring 21 being adapted to cooperate with a drive bearing surface forming part of one of these members and a retaining groove forming part of the other of them.

In the embodiments shown, the drive bearing surface forms part of the coupling member 20 and the retaining groove part of the drive member 14, but the opposite arrangement is also possible.

These arrangements are incidentally well known of themselves, notably through U.S. patent application Ser. No. 603,287 filed Apr. 23, 1984 now U.S. Pat. No. 4,588,061, and as they do not of themselves form part of the present invention they will not be described in more detail here.

In a manner also known of itself, the operating member 11 of the bearing 10 comprises a sleeve 23 by means of which it is slidably engaged on the guide member 13, an annular flange 24 extending transversely relative to the axis of the assembly at one end of said sleeve 23 and, at the outside periphery of this annular flange 24, an axial rim 25 coaxial with, extending annularly around and facing in the same axial direction as the sleeve 23, in which are formed spaced elastically deformable lugs 26 for snap-fastener engagement with the cover 16, as will emerge hereinafter, there being three such lugs in the embodiments shown, said elastically deformable lugs 26 being each separated laterally by axial slots from the main part of said axial rim 25.

In the embodiments shown the cover 16 is of sheet metal. It comprises an annular skirt 28 around the axis of the assembly through the intermediary of which it is engaged with the axial rim 25 of the operating member 11 and, at the end of the skirt 28 opposite the annular flange 24 of the operating member 11, transverse to said axis, an edge 29 bent inwards and thus extending radially towards this axis.

Openings 30 are formed in the skirt 28, at spaced locations corresponding to the axial lugs 26 of the operating member 11, at the level of the bent edge 29; over the transverse edge of these the respective axial lugs 26 are engaged by means of a bead; the main part of said axial rim 25 of the operating member 11 bears on said bent edge 29 of the cover 16 through the edge surface at its end.

The drive member 14 is mainly accommodated within the internal volume defined by the operating member 11, between its sleeve 23 and its axial rim 25; in the embodiments shown it is formed by a ball bearing of which the outer race 32, operated on by an axially acting elastic washer 23 bearing against the annular flange 24 of the operating member 11, presses through its opposite edge on the bent edge 29 of the cover 16, and the inner race 34 of which is adapted by means of a groove 35 to cooperate with the elastic ring 21, said inner race 34 projection axially for this purpose outside the cover 16 by virtue of the central opening of said bent edge 29 of the latter.

The clutch release bearing 10 in accordance with the invention comprises, in substantially diametrally opposed positions relative to each other, two transverse bearing facets 38 for the clutch release yoke 12 to act on; they extend generally radially for the purpose of cooperation with the ends or pads of the fingers 18 of said clutch release yoke 12.

As this is a "pull" type clutch release bearing, these transverse bearing facets 38 face axially towards the end of the drive member 14, that is to say in the direction of the portion of said drive member 14 through which the latter is adapted to operate on the clutch release device 15 of the clutch to be controlled.

In practice, these transverse bearing facets 38 each form part of a lug 39 which is in one piece with the cover 16, extending transversely in the direction away from the axis of the assembly from the end of the skirt 28 of the latter opposite its bent edge 29, substantially in the plane of the annular flange 24 of the operating member 11.

It is thus through the intermediary of the cover 16 that the operating member 11 is in this case adapted to be operated on by the clutch release yoke 12.

Each of the lugs 39 that the cover 16 thus features has its main part slighly offset axially towards the bent edge 29 relative to its lateral edges, which are substantially level with the end concerned of the skirt 28, in order to stiffen it.

The clutch release bearing 10 in accordance with the invention further comprises, in the embodiments shown, two axial guide facets 40 for the clutch release yoke 12 to act on, parallel to each other and extending generally axially; relative to the axial plane P of the assembly which is substantially perpendicular to them, and according to an arrangement which is the subject matter of the U.S. Pat. No. 4,498,566 mentioned hereinabove, they are truncated, said axial guide facets 40 being over part of their axial length at least entirely disposed one on a first side of said axial plane P and the other on the opposite side thereof.

The location of the axial plane P in question is schematically represented in chain-dotted line in FIGS. 1, 3 and 5.

It also corresponds to the plane of FIG. 2.

In practice this axial plane P passes through the median area of the lugs 39 of the cover 16, the axial guide facets 40 each extending substantially in line with the respective corresponding transverse bearing facets 38.

In practice these axial guide facets 40 are formed on the cover 16 and extend over the full height thereof.

They are formed by simple localized stamped portions of the skirt 28 of the cover 16, extending substantially tangentially to the outside surface of the latter from the axial plane P which is perpendicular to them.

In other words, in the embodiments shown the axial guide facets 40 consist of the outside face of bosses projecting in the thickness of the skirt 28 of the cover 16, said bosses merging tangentially with the outside surface of this skirt 28, substantially perpendicularly to the axial plane P of the assembly passing through the median area of the associated lugs 39.

Be this as it may, the function of the axial guide facets 40 is to cooperate in contact with the lateral faces of the fingers 18 of the clutch release yoke 12, for immobilizing the clutch release bearing 10 against rotation about its axis, in service, in a circumferential direction hereinafter referred to as the preferred circumferential direction, said preferred circumferential direction corresponding to the rotational forces to which said clutch release bearing is then subjected.

In accordance with the invention, the clutch release bearing 10 further comprises, permanently and in combination, on the one hand abutment means adapted to procure circumferential bearing engagement of the clutch release bearing in a first direction against another member, on rotation about its axis, and on the other hand bracing means adapted to oppose retrograde rotation of the clutch release bearing in a second direction opposite the aforementioned direction after such circumferential bearing engagement.

In the embodiments shown, these abutment means are formed by a specific lug 42 in one piece with and projecting generally radially from the cover 16.

This lug 42 which is in practice substantially mid-way between the two lugs 39 carrying the transverse bearing facets 38 comprises, in the embodiments shown, a generally transverse first section 43 extending obliquely from the end of the annular skirt 28 of the cover 16 opposite the bent edge 29 of the latter and a generally axial second section 44 at right angles to the preceding section extending within the axial thickness of the release bearing, that is to say between said end of the skirt 28 of the cover 16 and its bent edge 29

It is through the intermediary of this generally axial section 44 that the lug 42 is adapted to cooperate abutment fashion with a member external to the clutch release bearing 10.

In practice, and as will emerge hereinafter, this is the clutch release yoke 12, more precisely the inside face of one of the fingers 18 of the latter.

The bracing means employed in accordance with the invention are preferably elastically deformable so as to be able to be engaged with the clutch release yoke 12 part of the time through a transverse face of the clutch release yoke 12 and part of the time through an axial face thereof.

In the embodiments shown, these bracing means comprise a leaf spring 46 disposed substantially circumferentially around the clutch release bearing 10 that carries it and comprising, in succession, a first section 47 by which it is attached to said clutch release bearing 10, a second section 48 by which it extends generally parallel to a transverse bearing facet 38 of the latter, and a third or bracing section 49 which forms its free end.

In practice, by means of its first section 47 this leaf spring 46 is attached to a radial lug 50 of the clutch release bearing 10 situated circumferentially short of the corresponding transverse bearing facet 38 of the latter relative to its free end 49 and thus short of the axial guide facet 40 associated with this transverse bearing facet 38.

In the embodiments shown this lug 50 is in one piece with the cover 16 of the clutch release bearing 10, continuous with the lug 39 thereof on which is formed the transverse bearing facet 38 concerned.

In practice, the leaf spring 46 is attached to this lug 50 of the cover 16 by a rivet 51 in its section 47.

In the embodiments shown, the second section 48 of the leaf spring 46 has, when seen from the side (FIG. 3), a generally S-shaped configuration in order to bear on a transverse face of the clutch release bearing 10, more precisely on that of the transverse faces of the finger 18 concerned of this clutch release yoke 12 which faces axially away from the corresponding transverse bearing facet 38.

In the unstressed condition, and as schematically represented in chain-dotted line at 49' in FIG. 3, the third section 49 of the leaf spring 46 extends substantially transversely relative to the axis of the assembly and thus substantially parallel to the corresponding transverse bearing facet 38, within the thickness of the finger 18 concerned of the clutch release yoke 12.

Seen in elevation (FIG. 1) the first and third sections 47 and 49 of the leaf spring 46 extend obliquely relative to its second or median section 48, on the same side of this second section 48.

In the embodiment specifically shown in FIGS. 1 through 7 and given that, as mentioned hereinabove, the axial guide facets 40 are disposed wholly on a first side of the axial plane P of the assembly which is substantially perpendicular to them in the case of one of them and on the opposite side of this axial plane P in the case of the other of them the bracing means that the leaf spring 46 forms of themselves constitute specific retaining means adapted to oppose any rotation of the clutch release bearing 10 about its axis in service in the circumferential direction opposite to the preferred circumferential direction for which the axial guide facets procure such retention.

For cooperation in circumferential abutment engagement with such retaining means, that of the fingers 18 of the clutch release yoke 12 which is associated with this leaf spring 46 features a heel-piece 52 (FIG. 3) projecting axially at its end in the direction away from the corresponding axial guide facet 40, and thus in the direction towards one of the bends in the second section 48 of this leaf spring 46.

The clutch release bearing 10 in accordance with the invention comprises, in the embodiments shown, a specific lug 54 for an operating member 53 adapted to cause it to rotate about its axis to act on.

This lug 54 is in one piece with and projects generally radially from the cover 16; it comprises a generally transverse first section 55 originating from the ends of the skirt 28 of the cover 16 opposite its bent edge 29 and a generally axially second section 56 projecting at least in part axially from the axial thickness of the clutch release bearing 10, on the side of the latter opposite the end of its drive member 14.

In other words, conversely to the axial section 44 of the previous lug 42, this axial section 56 of the lug 54 extends axially away from the bent edge 29 of the cover 16.

As shown, it preferably has a right-angle rib 57 along one of its edges.

Generally speaking, the thus constituted lug 54 is disposed at a substantially diametrally opposed position relative to the lug 42 constituting the associated abutment means.

In the embodiments shown, the associated manipulation member 53 is a simple rod slidably engaged in a passage 58 of specific and small size formed for this purpose, orthogonally to the axis of the assembly, in the wall of the casing 59 of the clutch to be controlled; it features at its end a right-angle bend 60 for the purpose of its operation on the lug 54 of the clutch release bearing 10.

Finally, in the embodiment shown the cover 16 of the clutch release bearing 10 comprises tangs 62 each facing a respective one of the lugs 39 carrying then transverse bearing facets 38, formed by depressing the cover 16 in the plane of the bent edge 29 thereof, and extending substantially radially, parallel to said transverse bearing facets 38.

At assembly time, and firstly in the case, for example, of the embodiment specifically shown in FIGS. 1 through 7, the clutch release bearing 10 in accordance with the invention is placed on its guide 13 which is carried by the casing of the gearbox and the clutch release yoke 12 is engaged over it, by its fingers 18, each of said fingers 18 being inserted between the corresponding axial guide facet 40 and the tang 62 which is parallel to it, with one of them further engaged under the median section 48 of the leaf spring 46 constituting the bracing means provided in accordance with the invention (FIGS. 1 and 3).

The clutch release yoke 12 is then mounted to pivot on the casing of the gearbox.

After the assembly which, comprising the gearbox, is equipped in this way with the clutch release bearing 10 and the clutch release yoke 12, is brought axially towards the motor assembly carrying the clutch to be controlled, it is sufficient in order to couple the clutch release bearing 10 to the clutch release device 15 of the latter to procure corresponding axial displacement of the clutch release bearing 10 in the direction towards the clutch release device 15, operating appropriately on the clutch release yoke 12 by pivoting the latter about its axis in the direction of the arrow F1 in FIG. 3.

Acting on the tangs 62 provided for this purpose on the cover 16 of the clutch release bearing 10, the clutch release yoke 12 then causes snap-fastener fasion engagement of the drive member 14 of the clutch release bearing 10 over the coupling member 20 carried by the clutch release device 15.

In order to demount the assembly thus obtained, that is to say to decouple the clutch release yoke 12 from the clutch release bearing 10 to permit separation of the assemblies comprising the clutch release yoke 12 and the clutch release bearing 10, it is sufficient to operate on the operating member 53.

Pushed forward, this bears against the lug 54 of the clutch release bearing 10, more precisely on the rib 57 on the axial section 56 thereof, and this results in rotation of the clutch release bearing 10 on itself about its axis in the direction of the arrow F2 in FIG. 1 and FIG. 6.

This operation, which is in practice carried out blind, being controlled from outside the casing of the clutch, is continued until, as shown by FIG. 6, the lug 42 constituting the abutment means in accordance with the invention comes into circumferential bearing engagement with the inside face of that of the fingers 18 of the clutch release yoke 12 which is on the downstream side for the circumferential direction of rotation concerned.

Conjointly with this, by virtue of the fact that it is carried by the clutch release bearing 10, the leaf spring 46 constituting the bracing means also provided in accordance with the invention has progressively escaped from the finger 18 concerned of the clutch release yoke 12 and, when fully released therefrom (FIGS. 6 and 7), it resumes its unstressed rest configuration in which its end section 49 extends substantially transversely relative to the axis of the assembly, in line with the axial facet at the end 63 of said finger 18 of the clutch release yoke 12, the position of the yoke being determined by the linkage to which it is coupled for the purpose of controlling it.

Any retrograde rotation of the clutch release bearing 10 about its axis is then impossible, the leaf spring 46 opposing any such retrograde rotation by virtue of its abutment against said axial facet at the end 63 of the finger 18 concerned of the clutch release yoke 12.

Since the lugs 39 on the cover 16 of the clutch release bearing 10 carrying the transverse bearing facets 38 of the latter have conjointly escaped from the finger 18 of the clutch release yoke 12, the required demounting is then possible.

As described in the U.S. Pat. No. 4,498,566 mentioned hereinabove, the rotation of the clutch release bearing 10 about its axis necessary for such demounting is of course rendered possible by the fact that the axial guide facets 40 that it comprises are entirely disposed on one side only of the axial plane P of the assembly passing through the axis of the assembly, on a first side of this plane in the case of one of them and on the opposite side of this plane in the case of the other of them.

As will be noted, in the embodiment specifically shown in FIGS. 1 through 7, at the time of assembly and of the snap-fastener engagement of the drive member 14 of the clutch release bearing 10 with the coupling member 20 carried by the clutch release device 15, the immobilization against rotation of said clutch release bearing 10 about its axis, necessary to avoid disconnection from the clutch release yoke 12, is achieved in one circumferential direction by the axial guide facets 40 and in the opposite circumferential direction by the leaf spring 46 constituting the bracing means in accordance with the invention, in cooperation in both cases with said clutch release yoke 12, more precisely, in the case of the leaf spring 46, with the heel-piece 52 provided for this purpose on the clutch release yoke 12.

In the embodiment shown, the same applies in service.

On the other hand, on demounting only the bracing means in accordance with the invention are operative, in cooperation with the clutch release yoke 12 or any other form of abutment member.

In the embodiment specifically shown in FIGS. 1 through 7, it is over their full axial length that the axial guide facets 40 of the clutch release bearing 10 are truncated.

As an alternative to this (FIGS. 8 through 16) they are truncated in this way over part only of their axial length.

In this embodiment, the axial guide facets 40 of the clutch release bearing 10 in accordance with the invention extend entirely on one side of the axial plane P over part only of their axial length, said axial guide facets 40 each extending to each side of said axial plane P over another portion of their axial length, in the vicinity at least of the associated transverse bearing facets 38.

In other words, these axial guide facets 40 extend to each side of the axial plane P of the assembly which is substantially perpendicular to them over a portion I at least of their axial length, in practice running from the associated transverse bearing facets 38, whereas in the remaining portion II thereof, and by virtue of arrangements previously described, they are truncated.

The portions I and II that the axial guide facets 40 thus feature may have the same axial length, for example.

The remaining arrangements are of the type previously described.

The assembly procedure is also as previously described; note, however, that on snap-fastener engagement of the drive member 14 of the clutch release bearing 10 with the coupling member 20 carried by the clutch release device 15, immobilization in rotation about its axis of said clutch release bearing 10, necessary to avoid its disconnection from the clutch release yoke 12, is achieved by the portion I of the axial guide facets 40 which extends to each side of the axial plane P passing through their median area.

For demounting, on the other hand, that is to say for decoupling the clutch release yoke 12 from the clutch release bearing 10 to permit separation of the assemblies carrying the clutch release yoke 12 and the clutch release bearing 10, it is first necessary to operate on the clutch release yoke 12, in the direction of the arrow F1 in FIG. 10, so as to bring the ends of the fingers 18 of this clutch release yoke in line with the truncated portion II of the axial guide facets 40 of the clutch release bearing 10.

During this operation the median section 48 of the leaf spring 46 constituting the bracing means employed is pushed back elastically, possibly far enough to contact the corresponding tang 62 of the cover 16.

It is then sufficient to operate on the operating member 53 are previously.

Pushed forward, this bears against the lug 54 of the clutch release bearing 10, more precisely against the rib 57 of the axial section 56 thereof, and there results rotation on itself about its axis of the clutch release bearing 10 in the direction of the arrow F1 in FIG. 8 and FIG. 15, such rotation being then possible by virtue of the fact that it is in line with the truncated portion II of the axial guide facets 40 of the clutch release bearing 10 that, as indicated, the end 19 of the fingers 18 of the clutch release yoke 12 is then disposed.

This action, which is carried out blind as previously, is continued until, as previously, the leaf spring 46 constituting the bracing means escapes from the finger 18 connected of the clutch release yoke 12.

For the rotation of the clutch release bearing 10 necessary for demounting to take place, the ends or pads 19 of the fingers 18 of the clutch release yoke 12 must of course be of appropriate axial size, this axial extent having to be at least equal to that of the truncated portion II of the axial guide facets 40 of the clutch release bearing 10.

It should also be noted that, in this embodiment, there is normally no requirement for a projection or other form of heel-piece 52 at the end 19 of the fingers 18 of the clutch release yoke 12, the non-truncated portion I of the axial guide facets 40 of the clutch release bearing 10 being sufficient to immobilize the latter in rotation, just as much at assembly time as in service.

Although a heel-piece 52 of this kind is shown in the figures, it is specifically to provide sufficient axial surface area of the axial facet at the end 63 with which must cooperate abutment fashion the leaf spring 46 constituting the bracing means in accordance with the invention.

The present invention is not limited to the embodiments described and shown, but encompasses any variant execution.

In particular, the abutment means provided in accordance with the invention on the clutch release bearing may be formed by an already existing portion of the latter, without it being necessary to provide for this purpose any specific lug on its cover, and/or the exterior member of the bearing with which these abutment means must cooperate in bearing engagement is not necessarily constituted by the associated clutch release yoke but could equally well, for example, consist of one or other of the casings in question.

Likewise, instead of operating on a specific lug of the release bearing, the operating member employed to procure at assembly time rotation of the clutch release bearing on itself about its axis could equally well operate on an already existing portion of the clutch release bearing, for example on one of the lugs that the latter features for forming the transverse bearing facets needed for the clutch release yoke to act on.

Furthermore, where necessary this operating member or an operating member of the same type may also be used at assembly time.

Also, and as described in the U.S. Pat. No. 4,498,566 mentioned hereinabove, the fingers of the clutch release yoke may be shaped so as to facilitate on demounting the passage of the lugs on the clutch release bearing carrying its transverse bearing facets, which makes it possible to reduce the amplitude of the rotation to be applied to the clutch release bearing to obtain its pivoted position necessary for such demounting, and consequently to reduce the length of the leaf spring constituting the bracing means employed and that of the corresponding operating member.

As already indicated, in all cases the bracing means provided in accordance with the invention may of themselves constitute the means for immobilizing the clutch release bearing against rotation in service, which can make it possible to dispense with the axial guide facets on the latter; if necessary, these bracing means may comprise not just one leaf spring but rather two, to cooperate with the respective two fingers of the associated clutch release yoke.

Also, the two transverse bearing facets that the clutch release bearing in accordance with the invention features may form part of a circumferentially continuous flange on the latter.

Finally, the field of application of the invention is not necessarily limited to that of clutch release bearings for which engagement with the clutch release device of the clutch to be controlled is achieved by snap-fastener action, but extends more generally to that of all "pull" type clutch release bearings.

What we claim is:

1. Clutch release bearing, in particular for automotive vehicles, comprising at least two generally radial transverse bearing surfaces located generally diametrically opposite to each other and cooperable with arms of a clutch release control member, abutment means for providing circumferential bearing engagement in a first direction with means provided on the control member upon demounting rotation about the axis of the clutch release bearing and bracing means for opposing retrograde rotation of the clutch release bearing in a second direction opposite the first direction after such circumferential bearing engagement.

2. Clutch release bearing according to claim 1, wherein said bracing means are elastically deformable means for engagement with the control member part of the time through a transverse face of the control member and part of the time through an axial face thereof.

3. Clutch release bearing according to claim 2, wherein said bracing means comprise a leaf spring extending substantially part circumferentially around the release bearing and include, in succession, a first section attached to said release bearing a second section extending generally parallel to a corresponding one of a pair of transverse bearing facets, and a third section forming a free end of said lead spring.

4. Clutch release bearing according to claim 3, wherein the first section of said leaf spring is attached to a radial lug of the release bearing situated circumferentially short of the corresponding transverse bearing facet relative to its free end.

5. Clutch release bearing according to claim 3, in which the second section of said leaf spring has a generally inverted S-shaped configuration in section.

6. Clutch release bearing according to claim 3, wherein the third section of said leaf spring extends substantially at right angles to the axis of the release bearing when said leaf spring is in its rest configuration.

7. Clutch release bearing according to claim 4, comprising an operating member cooperable with the clutch release control member, a drive member cooperable with a clutch release device, and a cover axially coupling said drive member to said operating member, two parallel axial guide facets formed on the cover, each of transverse bearing facets forming part of a lug which is in one piece with the cover and the lug to which the leaf spring is attached being continuous and in one piece with a lug in one piece with the cover.

8. Clutch release bearing according to claim 2, wherein said axial guide facets each are of L-shaped contour whe viewed radially.

9. Clutch release bearing according to claim 2, wherein said second axial portions are axially adjacent corresponding ones of said transverse bearing facets.

10. Clutch release bearing according to claim 1, further comprising two parallel axial guide facets cooperable with the clutch release control member extending generally chordally for circumferentially retaining the clutch release bearing in a first circumferential direction one of the axial guide facets being disposed entirely on a first side of an axial plane of the clutch release bearing and the other axial guide facet being entirely disposed on the opposite side of said axial plane, the bracing means defining retaining means adapted to oppose rotation of the release bearing about its axis, in service in a circumferential direction opposite to the first circumferential direction.

11. Clutch release bearing according to claim 10, wherein the bracing means are for cooperation with an axial projection on the clutch release control member for opposing rotation of the release bearing about its axis in operation.

12. Clutch release bearing according to claim 1, wherein said bracing means in cooperation with the clutch release control member constitute retaining means for opposing rotation of the clutch release bearing about its axis in both circumferential directions.

13. Clutch release bearing according to claim 1, wherein said abutment means comprises a substantially radial lug.

14. Clutch release bearing according to claim 13, wherein said lug comprises a generally axial section extending within axial limits of the rest of the release bearing for cooperation in abutting relationship with the clutch release control member.

15. Clutch release bearing according to claim 13, comprising an operating member cooperable with the clutch release control member, a drive member cooperable with a clutch release device, and a cover axially coupling said drive member to said operating member, two parallel axial guide facets formed on the cover cooperable with the clutch release control member ad the lug forming the abutment means being in one piece with said cover.

16. Clutch release bearing according to claim 1, comprising a lug projecting generally radially and cooperable with a manipulating member for effecting demounting rotation of the clutch release bearing about its axis.

17. Clutch release bearing according to claim 16, wherein said lug comprises a generally axial section which at least in part extends axially beyond an axial limit of the rest of release bearing.

18. Clutch release bearing according to claim 17, wherein said axial section of said lug features a right-angle rib along one of its edges.

19. Clutch release bearing according to claim 16, comprising an operating member cooperable with the control member, a drive member cooperable with a clutch release device, and a cover axially coupling said drive member to said operating member, two parallel axial guide facets formed on the cover and the lug cooperable with the manipulating member being in one piece with the cover.

20. Clutch release bearing according to claim 1, wherein the cooperable means are defined by a portion of the clutch release control member.

21. Clutch release bearing according to claim 1, wherein two parallel axial guide facets are provided diametrically opposite each other for cooperation with the clutch release control member, said guide facets being perpendicular to an axial plane extending through the axis of the clutch release bearing, said axial guide facets having respective first axial portions disposed entirely on opposite sides of said axial plane and second axial portions disposed on both sides of said axial plane.

22. Clutch release bearing according to claim 1, comprising an operating member cooperable with the clutch release control member, and a drive member cooperable with a clutch release device, and a cover axially coupling said drive member to said operating member, two parallel axial guide facets formed on the cover cooperable with the clutch release control member.

23. Clutch release bearing according to claim 22, wherein the cover further comprises tangs which extend substantially radially, parallel to the transverse bearing surfaces.

24. Clutch release bearing according to claim 22, wherein each transverse bearing surface forms part of a lug which is in one piece with the cover.

* * * * *